US012777016B2

(12) United States Patent
Sundararajan et al.

(10) Patent No.: US 12,777,016 B2
(45) Date of Patent: Oct. 27, 2026

(54) SYMMETRIC NAT DETECTION AND CONNECTIVITY SUPPORT

(71) Applicant: Cisco Technology, Inc., San Jose, CA (US)

(72) Inventors: Balaji Sundararajan, Fremont, CA (US); Diana Laura Serrano Lozano, Wylie, TX (US); Sourav Sen, San Jose, CA (US); Sheikh Muhammad Qumruzzaman, Santa Clara, CA (US); Sampath Kumar Sthothra Bhasham, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/929,331

(22) Filed: Oct. 28, 2024

(65) Prior Publication Data

US 2026/0122028 A1 Apr. 30, 2026

(51) Int. Cl.
*H04L 61/2503* (2022.01)

(52) U.S. Cl.
CPC ................................ *H04L 61/2591* (2025.05)

(58) Field of Classification Search
CPC ............. H04L 61/2517; H04L 61/2591; H04L 61/2514; H04L 61/4511; H04L 63/0272; H04L 69/22; H04L 61/00; H04L 63/0236; H04L 63/08; H04L 61/256
See application file for complete search history.

(56) References Cited

U.S. PATENT DOCUMENTS 7,856,506 B2 * 12/2010 Takeda ................ H04L 61/2578 709/227
8,165,091 B2 * 4/2012 Nix ..................... H04L 61/2575 370/331
8,194,683 B2 * 6/2012 Sehgal .................. H04L 69/167 370/254
8,307,401 B1 * 11/2012 Lida ....................... H04N 5/268 725/78
9,264,459 B2 * 2/2016 Mosko ................ H04L 65/1069
(Continued)

FOREIGN PATENT DOCUMENTS

CN 105827748 A 8/2016

OTHER PUBLICATIONS

Shen et al., "Automatic Symmetric Network Address Translation Discovery and Traverse Between Software-Defined Wide Area Network Edge Devices," Technical Disclosure Commons, Defensive Publications Series, May 20, 2020, 9 pages.

*Primary Examiner* — Ninos Donabed
(74) *Attorney, Agent, or Firm* — Lee & Hayes, P.C.

(57) ABSTRACT

Techniques described herein can detect sites at which symmetric network address translation (NAT) is employed and can manage network traffic to support data connections to devices at the detected symmetric NAT sites. During a detection stage, multiple network connections can be established with computing devices at a site. IP addresses and port addresses associated with the multiple network connections can be compared in order to detect the use of symmetric NAT. During a policy enforcement stage, sites that employ symmetric NAT can be added to a site list. A control policy can direct traffic for sites on the site list to one or more hubs configured to manage data connections on behalf of devices at symmetric NAT sites.

14 Claims, 7 Drawing Sheets

(56) References Cited

U.S. PATENT DOCUMENTS 9,401,891 B2 * 7/2016 Gopalakrishnan .......... H04L 61/2503
9,432,412 B2 * 8/2016 Chaturvedi .......... H04L 67/14
9,450,915 B1 * 9/2016 Olofsson .......... H04L 63/029
9,497,160 B1 * 11/2016 Diffie .......... H04L 61/2521
11,100,197 B1 * 8/2021 Bernardi .......... G06F 21/105
11,218,522 B1 * 1/2022 Yerli .......... H04N 7/147
2005/0165963 A1 * 7/2005 Satzke .......... H04L 61/2514 709/245
2006/0165049 A1 * 7/2006 Bou-Diab .......... H04L 47/39 370/351
2007/0189311 A1 * 8/2007 Kim .......... H04L 65/1104 370/466
2008/0201480 A1 * 8/2008 He .......... H04L 61/2578 709/227
2008/0215669 A1 * 9/2008 Gaddy .......... H04L 63/029 709/227
2008/0225867 A1 * 9/2008 Sehgal .......... H04L 61/2575 370/466
2008/0225868 A1 * 9/2008 Sehgal .......... H04L 61/2575 370/401
2008/0270626 A1 * 10/2008 Takeda .......... H04L 61/2575 709/238
2009/0028063 A1 * 1/2009 Chang .......... H04M 7/0063 370/252
2009/0228593 A1 * 9/2009 Takeda .......... H04L 61/2575 709/227
2010/0023629 A1 * 1/2010 Lennaerta .......... H04L 61/2514 709/228
2010/0040046 A1 * 2/2010 Ko .......... H04L 61/2564 370/352
2010/0198979 A1 * 8/2010 Pickens .......... H04L 61/2528 709/231
2010/0241710 A1 * 9/2010 Renfroe .......... H04L 61/2575 709/204
2010/0251335 A1 * 9/2010 Srisuresh .......... H04L 12/66 726/13
2014/0115174 A1 * 4/2014 Gopalakrishnan .......... H04L 61/2503 709/227
2014/0126421 A1 * 5/2014 Lida .......... H04L 41/12 370/254
2015/0113154 A1 * 4/2015 Nguyen .......... H04L 67/51 709/228
2015/0304276 A1 * 10/2015 Chen .......... H04L 61/2564 370/352
2018/0131672 A1 * 5/2018 Ravindranath .......... H04L 61/255
2020/0162418 A1 * 5/2020 Babu .......... H04L 61/2521
2022/0070236 A1 * 3/2022 Yerli .......... H04L 63/0861
2022/0070237 A1 * 3/2022 Yerli .......... G06T 19/00
2022/0070238 A1 * 3/2022 Yerli .......... H04L 65/4015
2022/0070239 A1 * 3/2022 Yerli .......... G06F 9/5077
2022/0070240 A1 * 3/2022 Yerli .......... H04L 65/4053
2022/0070241 A1 * 3/2022 Yerli .......... G06T 19/00
2023/0269305 A1 * 8/2023 Mestery .......... H04L 67/56 709/217
2024/0039839 A1 2/2024 Kondalam et al.
2024/0064124 A1 * 2/2024 Liang .......... H04L 61/2517

* cited by examiner

SYMMETRIC NAT DETECTION AND CONNECTIVITY SUPPORT

TECHNICAL FIELD

The present disclosure relates generally to Internet Protocol (IP) communications over computer networks, and to communications involving sites that employ symmetric network address translation (NAT) in particular.

BACKGROUND

Network address translation (NAT) is a method of mapping one Internet Protocol (IP) address space into another by modifying network address information in the IP header of packets while they are in transit across a router. NAT has several uses, including, e.g., conserving global address space in the face of address exhaustion occurring in version four (4) of the Internet Protocol (IPv4). Using NAT, one Internet-routable IP address, e.g., of a NAT gateway, can be used for multiple devices at a site including the NAT gateway. The site can include, e.g., a site of a private network, data center, or other location.

Many network address translators map multiple private hosts to one publicly exposed IP address. In a typical configuration, a site may have a router comprising both a private IP address and a public IP address. The private IP address is used by the router for communicating with other devices at the site. The public IP address is used by the router for communicating with the rest of the Internet.

As traffic passes from the site to the Internet, the router translates a source IP address in each IP packet from a private address to the router's own public address. The router tracks data pertaining to each active connection (particularly the destination address and port). When the router receives inbound traffic from the Internet, it uses connection tracking data to determine to which private IP address it should forward the reply.

NAT may be implemented in several ways, including, e.g., full cone NAT, address restricted cone NAT, port restricted cone NAT, and symmetric NAT. In symmetric NAT, a combination of one internal IP address plus a destination IP address and port is mapped to a single unique external source IP address and port. If a same internal host sends a packet with a same source address and port to a different destination, a different NAT mapping is used. As a result, without the benefit of techniques such as those provided herein, only an external host that receives a packet from an internal host can send a packet back. Furthermore, sites that themselves employ symmetric NAT cannot establish direct tunnels to other sites that employ symmetric NAT. Techniques are therefore needed to support more robust and flexible data connectivity for devices at sites that use symmetric NAT.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
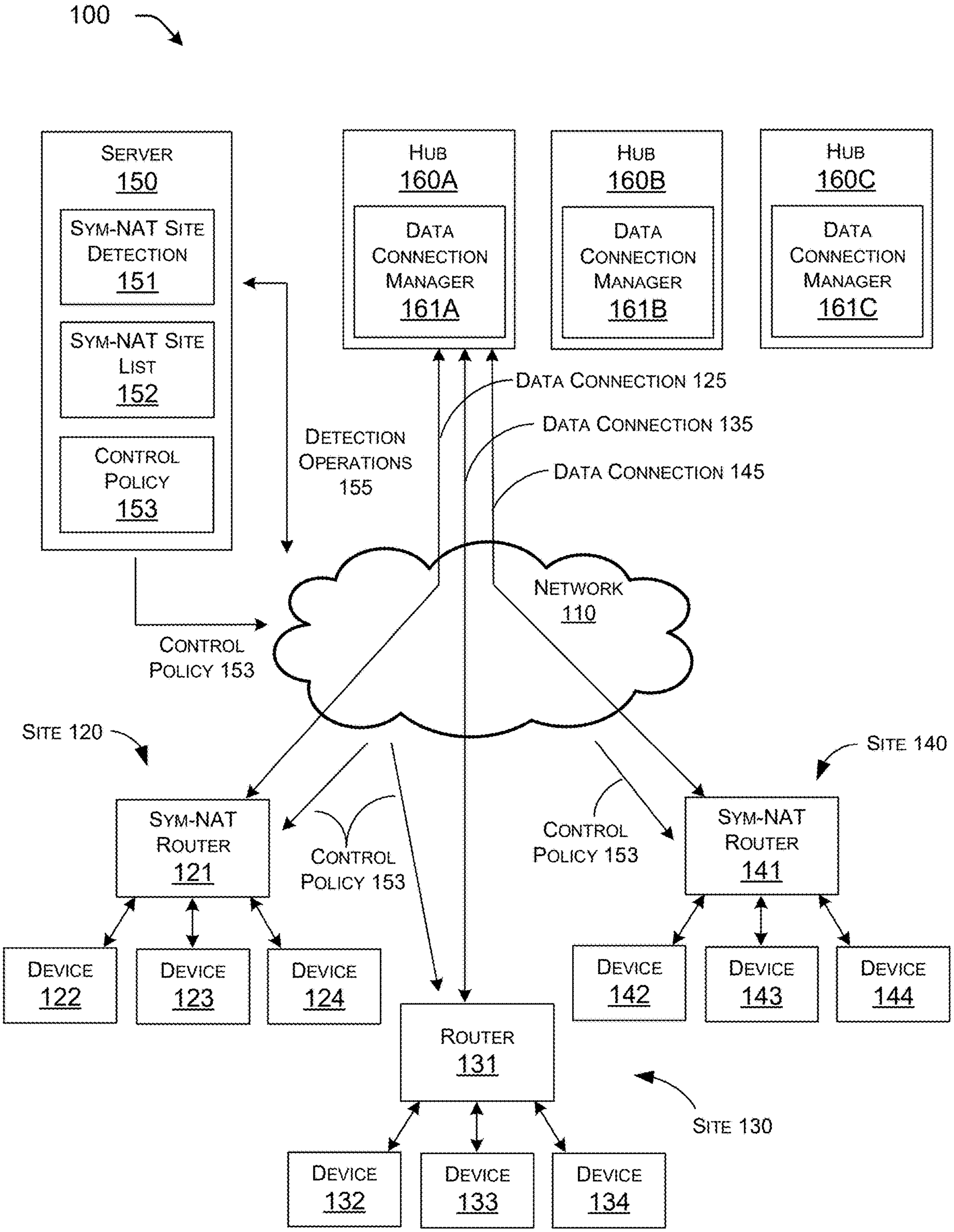
FIG. 1 illustrates an example architecture comprising multiple sites connected to a network, a server configured to detect symmetric NAT sites and build a symmetric NAT site list, and hubs configured to support data connections for the symmetric NAT sites, in accordance with various aspects of the technologies disclosed herein.

This disclosure describes techniques that can be performed in connection with detecting sites that employ symmetric NAT and supporting data connections involving devices at the detected symmetric NAT sites. Example techniques can include detecting whether symmetric NAT is employed at a site comprising one or more computing devices. In response to detecting that symmetric NAT is employed at the site, a site identifier associated with the site can be added to a site list in order to apply a control policy to the site. The control policy can direct internet protocol (IP) traffic for the site to a hub configured to serve as an intermediary manager of a data connection between a computing device of the one or more computing devices at the site and at least one other computing device associated with at least one other site.

The techniques described herein may be performed by one or more computing devices comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the network controller device.

Example Embodiments

In an example according to this disclosure, sites at which symmetric NAT is employed can be detected, and network traffic for symmetric NAT sites can be managed to support data connections of devices at the detected symmetric NAT sites. During a detection stage, multiple network connections can be established with one or more computing devices at a site. IP addresses and port addresses associated with the multiple network connections can be compared in order to detect the use of symmetric NAT. During a policy enforcement stage, sites that employ symmetric NAT can be added to a site list, and a control policy can direct traffic for sites on the site list to one or more hubs configured to manage data connections on behalf of devices at symmetric NAT sites.

A site employing symmetric NAT can be understood as a site at which requests from a same internal IP address and port to a specific destination IP address and port are mapped to a same unique external IP address and port. If a same internal host, e.g., a same device at the symmetric NAT site, sends a packet with the same source IP address and port to two different destinations, different NAT mappings are used resulting in different external IP addresses and ports. An external host that receives a packet from the internal host at the symmetric NAT site can send a user datagram protocol (UDP) packet back to the internal host, however, other external hosts cannot.

A session traversal utilities for NAT (STUN) server is a type of server used to help devices behind firewalls or NAT routers connect with other devices. STUN servers can respond to STUN binding requests sent by STUN clients and can provide a public IP address and port of the client. The IP address and port combination may be used by the STUN client in its peer-to-peer communication signaling. However, when an end host uses a same private IP address and port (let us assume that is bound to the public IP address and port provided in the STUN response), the NAT router translates it to a same IP address but a different port if symmetric NAT is employed. This can break UDP communication because the signaling had established the connection based on the previous port.

In order to support data connections involving devices at symmetric NAT sites, techniques according to this disclosure can first detect symmetric NAT sites. According to one example detection approach, a device such as a server or hub, or optionally, multiple servers or hubs, can establish multiple different connections to an edge device at a site. For instance, an edge device that is possibly behind a symmetric NAT may connect to the three hub devices. During the connection process, an overlay can learn the site comprising the edge device that connects to the three hubs carries three distinct IP addresses from a spoke point of view. This implies that the site is employing a symmetric NAT and the site can be classified as such.

After detecting a symmetric NAT site, the server or hub that performed the detection, or optionally another system, can build a symmetric NAT site list that includes, e.g., all sites discovered behind symmetric NAT routers. A control policy can be generated and applied to the sites included on the symmetric NAT site list. The control policy can indicate, for example, that for network traffic sent from one spoke symmetric NAT site to another spoke symmetric NAT site, a next hop can be resolved to be that of a designated hub site. The designated hub site can comprise a site which does not employ symmetric NAT.

The process of symmetric NAT site detection, including detected symmetric NAT sites on a symmetric NAT site list, and applying a control policy to the symmetric NAT sites on the symmetric NAT site list can be recursively repeated for all sites in a set of sites, in order to dynamically modify the symmetric NAT site list.

By applying the techniques described herein, embodiments can enable secure connectivity between symmetric NAT sites via one or more hubs. Having three hubs can facilitate conclusively identifying symmetric NAT sites without false positives. An entire overlay can thus be equipped with functional with symmetric NAT site to symmetric NAT site connectivity. As a result, symmetric NAT sites can build dynamic tunnels to other sites regardless of whether such other sites are behind a symmetric NAT router.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 comprising multiple sites 120, 130, 140 connected to a network 110, a server 150 configured to detect symmetric NAT sites 120, 140 and build a symmetric NAT site list 152, and hubs 160A, 160B, 160C configured to support data connections 125, 135, 145 for the symmetric NAT sites 120, 140, in accordance with various aspects of the technologies disclosed herein.

FIG. 1 comprises the example sites 120, 130, 140, the network 110, the server 150, and the hubs 160A, 160B, 160C. The site 120 comprises a symmetric NAT router 121 and example devices 122, 123, 124. The site 130 comprises a router 131 (which is not configured as a symmetric NAT router in this example) and example devices 132, 133, 134. The site 140 comprises a symmetric NAT router 141 and example devices 142, 143, 144. Because the sites 120, 140 include symmetric NAT routers 121, 141, the sites 120, 140 can be referred to as symmetric NAT sites. In contrast, the site 130 does not include a symmetric NAT router and can be referred to as a non-symmetric NAT site. The routers 121, 131, 141 can be configured, e.g., according to FIG. 4, FIG. 5, or FIG. 6. The various example devices 122, 123, 124, 132, 133, 134, 142, 143, 144, can be configured as endpoint devices such as laptops, desktops, mobile devices, televisions, internet of things (IOT) devices, or any other computing device.

Figure 4:
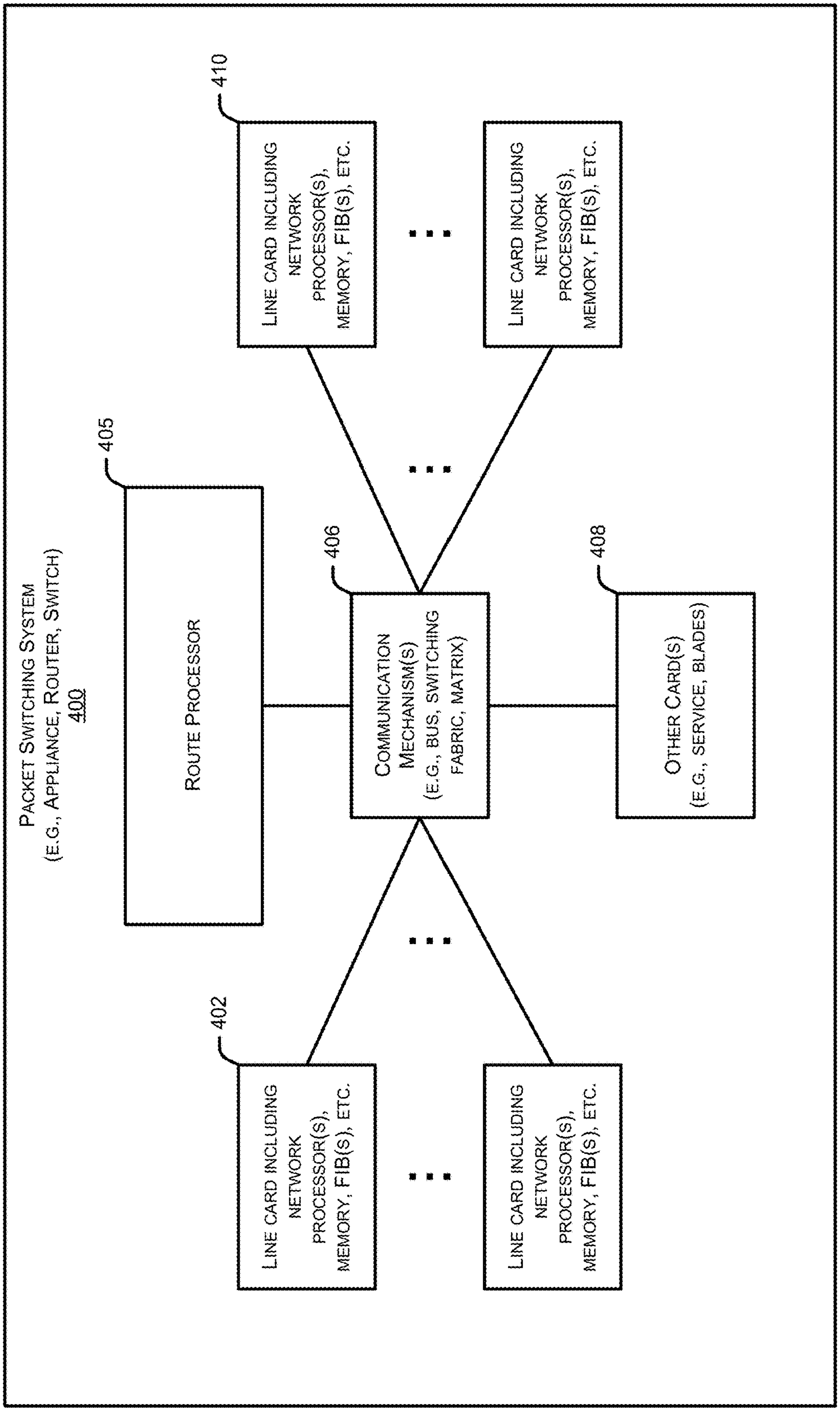
FIG. 4 illustrates an example packet switching system that can be utilized to implement devices in accordance with various aspects of the technologies disclosed herein.
Figure 5:
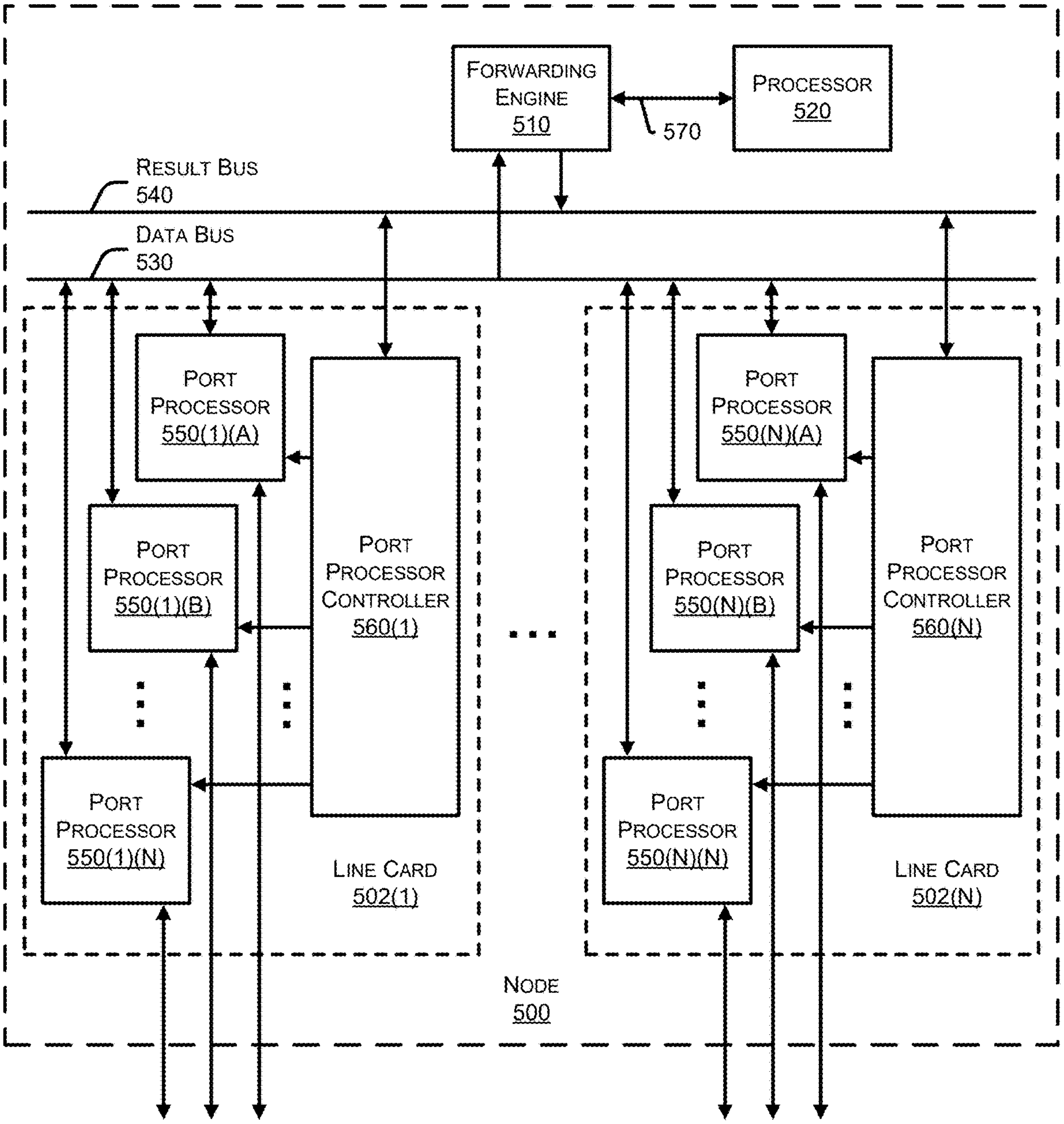
FIG. 5 illustrates an example node that can be utilized to implement devices in accordance with various aspects of the technologies disclosed herein.

The network 110 can be or comprise any public or private network. In some embodiments, the network can enable a software defined wide area network (SD-WAN) fabric overlay which connects the devices illustrated in FIG. 1. The server 150 can comprise any computing device(s), e.g., server computer devices according to FIG. 6. The server 150 includes symmetric NAT site detection 151, symmetric NAT site list 152, and control policy 153. The hubs 160A, 160B, 160C can also comprise any computing device(s), e.g., server computer devices according to FIG. 6, or other devices such as illustrated in FIG. 4 and FIG. 5. The hubs 160A, 160B, 160C can each include a respective data connection manager 161A, 161B, 161C.

In an example according to FIG. 1, the server 150 can be configured to employ symmetric NAT site detection 151 to perform detection operations 155. The detection operations 155 can detect which of the sites 120, 130, 140 are symmetric NAT sites. The server 150 can generate the symmetric NAT site list 152 comprising the detected symmetric NAT sites, e.g., the sites 120 and 140. The symmetric NAT site list 152 can be used to generate the control policy 153. The control policy 153 can be deployed into the network 110 and the sites/devices connected thereto, in order to direct network traffic to and from the detected symmetric NAT sites 120, 140 to one or more of the hubs 160A, 160B, 160C.

The hubs 160A, 160B, 160C can use the data connection managers 161A, 161B, 161C to establish data connections on behalf of sites (e.g., the symmetric NAT sites 120, 140) that direct traffic to the hubs 160A, 160B, 160C according to the control policy 153. For example, the hub 160A may establish a data connection 125 with one or more device(s) at the site 120. The 160A may also establish a data connection 135 with one or more device(s) at the site 130, and a data connection 145 with one or more device(s) at the site 140. The hub 160A may serve as an intermediate manager between the data connection 125 and the data connection 135, thereby enabling a data connection between the symmetric NAT site 120 and the site 130. The hub 160A may also serve as an intermediate manager between the data connection 125 and the data connection 145, thereby enabling a data connection between the symmetric NAT site 120 and the site 140.

The hubs 160A, 160B, 160C can optionally comprise regional hubs that serve a particular region, e.g., a region comprising the sites 120, 130 and 140. The region may be, e.g., a city or portion thereof, or a wider area such as a county or state. In some embodiments, the region may be defined within a wider network of connected regions. Other regions can comprise other hubs that service data connections for symmetric NAT sites in the other regions. In some examples, the region may be or comprise a region of a multiple systems operator (MSO) or other entity which serves the region.

In some embodiments, the hubs 160A, 160B, 160C can be configured to use secure tunnels to enable the data connections 125, 135, 145. For example, the hubs 160A can establish a secure tunnel to enable the data connection 125 between the device 122 and the hub 160A. The hub 160A can be configured to establish another secure tunnel to enable the data connection 135 between the hub 160A and at least one other device 132. The hub 160A can be configured to mediate a connection across the secure tunnels to link the data connection 125 with the data connection 135 in order to intermediate a data connection on behalf of the symmetric NAT site 120.

Figure 2:
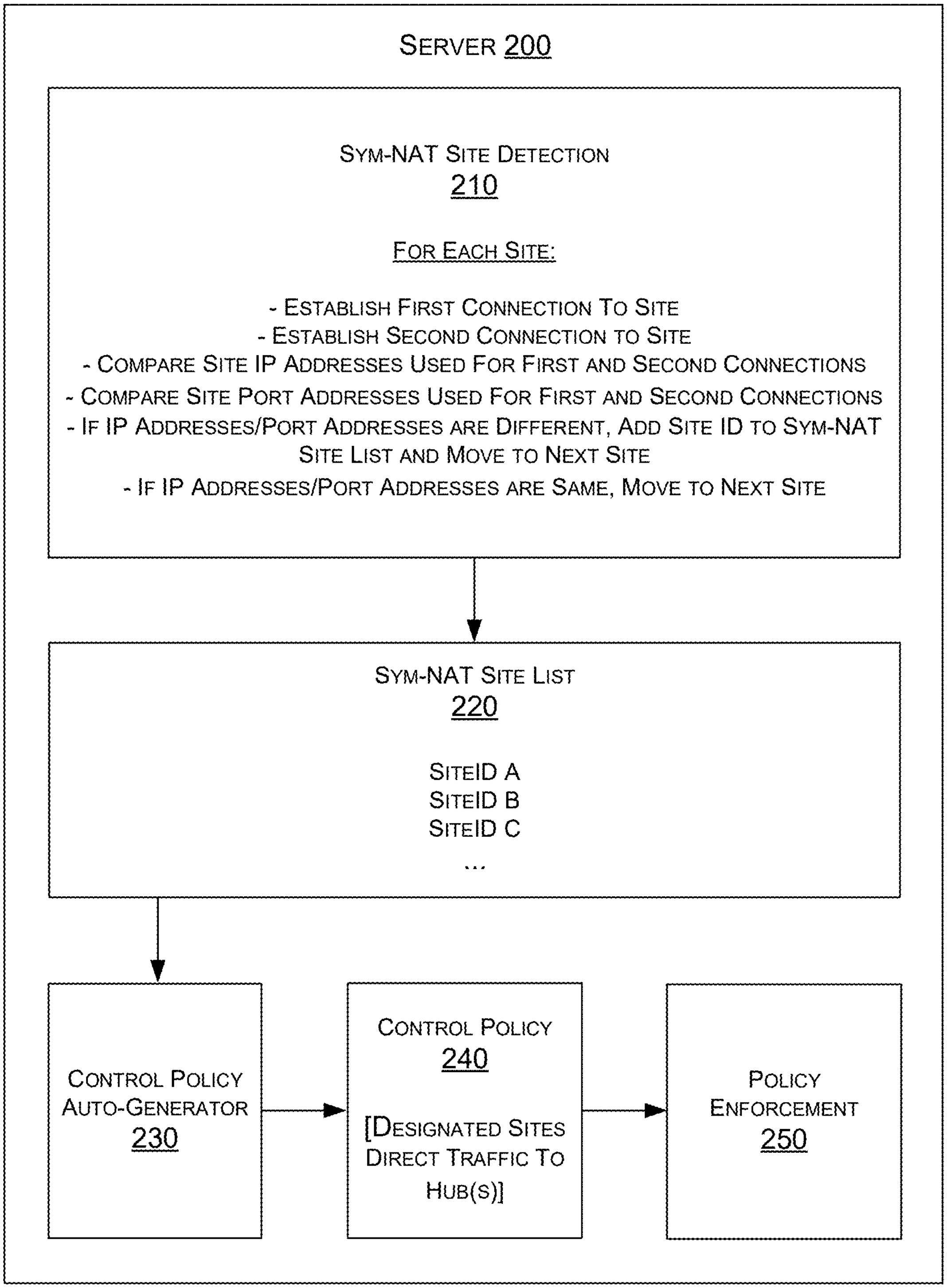
FIG. 2 illustrates an example server configured to detect symmetric NAT sites and build a symmetric NAT site list, in accordance with various aspects of the technologies disclosed herein.

FIG. 2 illustrates an example server 200 configured to detect symmetric NAT sites and build a symmetric NAT site list 220, in accordance with various aspects of the technologies disclosed herein. The example server 200 can implement the server 150 introduced in FIG. 1 in some embodiments. The server 200 comprises symmetric NAT site detection 210, symmetric NAT site list 220, control policy auto-generator 230, control policy 240, and policy enforcement 250.

FIG. 2 illustrates a set of example operations to enable symmetric NAT site detection 210. The example operations can be performed for each site, e.g., serially for up to all sites to which the server 200 can connect. The example operations include: establish first connection to site; establish second connection to site; compare site IP addresses used for first and second connections; compare site port addresses used for first and second connections; if site IP addresses/site port addresses are different, add site ID to symmetric NAT site list and move to next site; and if site IP addresses/site port addresses are same, move to next site.

In an example of symmetric NAT site detection operations performed by symmetric NAT site detection 210, at "establish first connection to site," the server 200 can establish a first IP connection with a selected device, e.g., device 122, from among the devices 122, 123, 124 at the site 120. The server 200 can use a first source IP address to identify itself (the server 200) for the purpose of the first IP connection.

At "establish second connection to site," the server 200 can establish a second IP connection with the selected device, e.g., device 122, from among the devices 122, 123, 124 at the site 120. The server 200 can use a second source IP address to identify itself (the server 200) for the purpose of the second IP connection.

In an alternative arrangement, the server 200 can coordinate with a second server (not shown in FIG. 2) which is configured similarly to the server 200 and which can establish the second IP connection using a second source IP address to identify itself (the second server) for the purpose of the second IP connection. In some embodiments, the functions of the server 200 can be implemented in the hubs 160A, 160B, 160C, and a first hub 160A can establish the first IP connection while a second hub 160B can establish the second IP connection. A third hub 160C can optionally further establish a third IP connection with the selected device, e.g., device 122, from among the devices 122, 123, 124 at the site 120. The third hub 160C can use a third source IP address to identify itself for the purpose of the third IP connection. Using three servers or three hubs for symmetric NAT site detection can reduce potential false positives to an acceptably low value for some implementations. In some embodiments, the first, second, third, or further IP connections established by the server 200 and/or the hubs 160A, 160B, 160C can optionally comprise vBond type connections.

At "compare site IP addresses used for first and second connections," the server 200 can compare the source IP address used to identify the selected device, e.g., device 122, in the first IP connection with the source IP address used to identify the selected device, e.g., device 122, in the second IP connection. In embodiments that make further use of third or further IP connections, the third or further IP addresses can also be compared with the IP addresses used for the first and second IP connections. In general, when different IP connections for a same selected device 122 use different IP addresses or port addresses, that is an indication that the site 120 comprising the selected device 122 is employing symmetric NAT.

At "compare site port addresses used for first and second connections," the server 200 can compare the port address used for the selected device, e.g., device 122, in the first IP connection with the port address used for the selected device, e.g., device 122, in the second IP connection. In embodiments that make further use of third or further IP connections, the third or further port addresses can also be compared with the port addresses used for the first and second IP connections. In general, when different IP connections for a same selected device 122 use different IP addresses or port addresses, that is an indication that the site 120 comprising the selected device 122 is employing symmetric NAT.

At "if site IP addresses/site port addresses are different, add site ID to symmetric NAT site list and move to next site," the comparison of IP addresses and/or port addresses used for the selected device, e.g., device 122, can determine that the IP addresses and/or port addresses in the first IP connection second IP connection, or third/additional IP connection are different. In some embodiments, any difference in the IP addresses and/or port addresses can trigger a determination of different IP addresses and/or port addresses. In other embodiments, only certain differences, e.g., differences in a predetermined subpart of an IP or port address, can trigger a determination of different IP addresses and/or port addresses. In response to a difference determination, the server 200 can be configured to add the site identifier of the site 120 comprising the selected device, e.g., device 122, to the symmetric NAT site list 220. The site identifier of the site 120 can comprise, e.g., "SiteID A" as illustrated in FIG. 1. The server 200 can then move on to perform the above described detection operations on a next site, e.g., on site 130.

At "if site IP addresses/site port addresses are same, a move to next site," the comparison of IP addresses and/or port addresses used for the selected device, e.g., device 122, can determine that the IP addresses and/or port addresses in the first IP connection second IP connection, or third/additional IP connection are the same. In other embodiments, only certain predetermined subparts of an IP or port address can be compared to determine the IP addresses and/or port addresses are the same. In response, the server 200 can be configured to skip adding the site identifier of the site 120 comprising the selected device, e.g., device 122, to the symmetric NAT site list 220. The server 200 can optionally be configured to instead add the site identifier of the site 120 comprising the selected device, e.g., device 122, to a different site list (not shown in FIG. 2) which identifies non-symmetric NAT sites. Such a non-symmetric NAT site may be useful in some embodiments to keep a history of sites for which symmetric NAT site detection has been performed. The server 200 can then move on to perform the above described detection operations on a next site, e.g., on site 130.

In some embodiments, detection operations performed by symmetric NAT detection 210 can perform detection operations 155 serially on one site after another. For example, symmetric NAT detection 210 can perform detection operations 155 on site 120 first, followed by site 130, followed by site 140. In other embodiments, detection operations may be performed at least partially in parallel, with operations being performed on multiple sites during a same or overlapping time period, optionally followed by further parallel detection operations.

Furthermore, detection operations performed by symmetric NAT detection 210 can optionally be repeated by repeating detection operations on sites for which previous detection operations have already been performed. Symmetric NAT detection 210 can optionally operate continuously in a loop to repeat detection operations across all sites, or symmetric NAT detection 210 can operate periodically by pausing detection operations for a period of time after completing detection operations on all sites or on a predetermined number of sites.

After detection has been performed on a threshold number, up to all available sites, the site list 220 can be considered sufficiently mature for generation of the control policy 240 by the control policy auto-generator 230. In some embodiments, detection operations of the symmetric NAT detection 210 can be performed continuously or according to a first periodic interval, and control policy 240 generation by the control policy auto-generator 230 can be performed according to a second periodic interval which can optionally be different from the first periodic interval.

The control policy auto-generator 230 can be configured to use the site list 220 to generate the control policy 240. In general, the control policy 240 can comprise a policy whereby all traffic originating from or destined to a site on the site list 220 is directed to one or more of the hubs 160A, 160B, 160C. The control policy auto-generator 230 can regenerate the control policy 240 automatically from time to time, using an updated symmetric NAT site list to update the control policy 240, thereby either adding new symmetric NAT sites to the control policy 240, or removing symmetric NAT sites from the control policy 240.

Furthermore, the control policy auto-generator 230 can add any other desired features to the control policy 240. For example, the control policy auto-generator 230 can generate a control policy 240 which directs all traffic from a particular site to particular one of the hubs 160A, 160B, or 160C, or the control policy auto-generator 230 can generate a control policy 240 which blocks traffic from a particular site. In further examples, the auto-generator 230 can generate a control policy 240 which prevents or blocks a designated site or type of site, whether a symmetric NAT site or otherwise, from connecting to the hubs 160A, 160B, or 160C. In further examples, the auto-generator 230 can generate a control policy 240 which directs certain designated traffic, e.g., traffic having a designated content type, a designated security credential, and/or a designated class of service, to the hubs 160A, 160B, or 160C, while other traffic (other than the designated traffic) is not directed to the hubs 160A, 160B, or 160C. It will be appreciated that an exhaustive list of all possible control policy 240 features is not practical and that any control policy 240 features can be implemented in different embodiments.

Policy enforcement 250 can be configured to deploy and enforce the control policy 240 in the network 110. For example, in some embodiments, policy enforcement 250 can be configured to send the control policy 240 to all sites listed on the symmetric NAT site list 220, as well as, optionally, to one or more policy enforcement entities within the network 110. Policy enforcement 250 can optionally, but need not necessarily, limit policy enforcement to a region comprising the sites 120, 130, 140 and the hubs 160A, 160B, or 160C. In some embodiments, policy enforcement 250 can limit policy enforcement to a particular network, e.g., a private network, in which a symmetric NAT site is detected. When policy enforcement 250 is itself configured to enforce the control policy 240, policy enforcement 250 can monitor network traffic or some portion of network traffic that traverses the network 110. Policy enforcement 250 can monitor site IDs of the network traffic and forward to the hubs 160A, 160B, or 160C all traffic having site IDs that are listed in the control policy 240.

Figure 3:
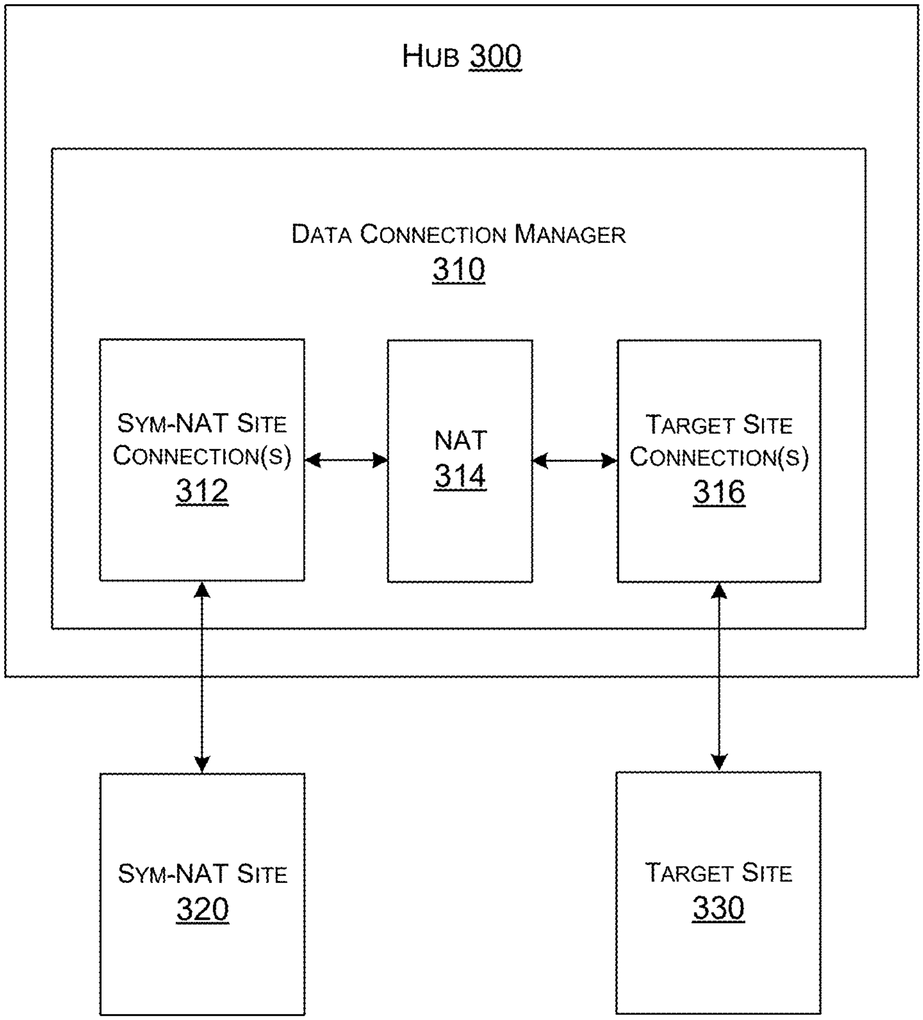
FIG. 3 illustrates an example hub configured to support data connections for symmetric NAT sites, in accordance with various aspects of the technologies disclosed herein.

FIG. 3 illustrates an example hub 300 configured to support data connections for symmetric NAT sites, in accordance with various aspects of the technologies disclosed herein. The example hub 300 can implement, e.g., any of the hubs 160A, 160B, or 160C introduced in FIG. 1. The hub 300 comprises a data connection manager 310. The data connection manager 310 comprises symmetric NAT site connection(s) 312, NAT 314, and target site connections(s) 316. FIG. 3 further comprises an example symmetric NAT site 320 and an example target site 330.

In an example according to FIG. 3, the symmetric NAT site 320 can be any site that is detected to be a symmetric NAT site, e.g., in a detection process performed at server 150. For example, the symmetric NAT site 320 can be the symmetric NAT site 120. Traffic from a device, e.g., the device 122, at the symmetric NAT site 320 can be forwarded to the hub 300 pursuant to a control policy 153. The data connection manager 310 can optionally establish a secure tunnel or other secure connection with the device at the symmetric NAT site 320, whereby the device at the symmetric NAT site 320 is among the symmetric NAT site connection(s) 312, enabling the data connection manager 310 to securely send and receive data to and from the device at the symmetric NAT site 320. Example connection types can include, e.g., voice over IP (VOIP) connections and artificial intelligence (AI) connections useful for sharing AI processing loads, e.g., for training machine learning models.

The target site 330 can be any site that communicates with the symmetric NAT site 320, regardless of whether the target site 330 is also a symmetric NAT site. For example, the target site 330 can be site 130 in FIG. 1. Traffic from a device, e.g., the device 132, at the target site 330 can be forwarded to the hub 300 pursuant to a control policy 153. The data connection manager 310 can optionally establish a secure tunnel or other secure connection with the device at the target site 330, whereby the device at the target site 330 is among the target site connection(s) 316, enabling the data connection manager 310 to securely send and receive data to and from the device at the target site 330. Example connection types can include, e.g., voice over IP (VOIP) connections and artificial intelligence (AI) connections useful for sharing AI processing loads, e.g., for training machine learning models.

The data connection manager 310 can be configured to link a connection among the symmetric NAT site connection(s) 312 with a connection among the target site connection(s) 316 in order to mediate traffic between the device at the symmetric NAT site 320 and the device at the target site 330. Traffic from the symmetric NAT site 320 which indicates a destination at the target site 330 can be forwarded by the data connection manager 310 to the target site 330, while traffic from the target site 330 which indicates a destination at the symmetric NAT site 320 can be forwarded by the data connection manager 310 to the symmetric NAT site 320.

The data connection manager 310 can optionally use NAT 314 to mediate traffic flowing between the symmetric NAT site 320 and the target site 330. For example, the data connection manager 310 can map a first "internal" IP address associated with the symmetric NAT site 320 to a second "external" IP address. The NAT can insert the external IP address as a source IP address for IP traffic flowing from the symmetric NAT site 320 to the target site 330. Return traffic from the target site 330 to the hub 300 which identifies the external IP address as a destination address can be translated by inserting the internal IP address (used by the symmetric NAT site 320 to identify a device) and forwarding the return traffic to the internal IP address destination at the symmetric NAT site 320.

FIG. 4 illustrates an example packet switching system 400 that can be utilized to implement devices such as routers or other devices in accordance with various aspects of the technologies disclosed herein. In some examples, the packet switching system 400 can be implemented as one or more packet switching device(s). The packet switching system 400 may be employed in a network, for example, the packet switching system 400 can implement a router configured to process network traffic by receiving and forwarding packets.

In some examples, the packet switching system 400 may comprise multiple line card(s) 402, 410, each with one or more network interfaces for sending and receiving packets over communications links (e.g., possibly part of a link aggregation group). The packet switching system 400 may also have a control plane with one or more processing elements, e.g., the route processor 405 for managing the control plane and/or control plane processing of packets associated with forwarding of packets in a network. The packet switching system 400 may also include other cards 408 (e.g., service cards, blades) which include processing elements that are used to process (e.g., forward/send, drop, manipulate, change, modify, receive, create, duplicate, apply a service) packets associated with forwarding of packets in a network.

The packet switching system 400 may comprise a communication mechanism 406 (e.g., bus, switching fabric, and/or matrix, etc.) for allowing the different entities such as the multiple line card(s) 402, 410, the route processor 405, and the other cards 408 to communicate. The communication mechanism 406 can optionally be hardware-based. Line card(s) 402, 410 may perform the actions of being both an ingress and/or an egress line card of the line card(s) 402, 410, with regard to multiple packets and/or packet streams being received by, or sent from, the packet switching system 400.

FIG. 5 illustrates an example node that can be utilized to implement devices in accordance with various aspects of the technologies disclosed herein. For example, the node 500 can implement any of the devices described herein. In some examples, node 500 may include any number of line cards 502, e.g., line cards 502(1)-(N), where N may be any integer greater than 1, and wherein the line cards 502 are communicatively coupled to a forwarding engine 510 (also referred to herein as an encryption engine) and/or a processor 520 via a data bus 530 and/or a result bus 540.

Line cards 502 may include any number of port processors 550, for example, line card 502(1) comprises port processors 550(1)(A)-550(1)(N), and line card 502(N) comprises port processors 550(N)(A)-550(N)(N). The port processors 550 can be controlled by port processor controllers 560, e.g., port processor controllers 560(1), 560(N), respectively.

Additionally, or alternatively, the forwarding engine 510 and/or the processor 520 can be coupled to one another via the data bus 530 and the result bus 540 and may also be communicatively coupled to one another by a communications link 570. The processors (e.g., the port processor(s) 550 and/or the port processor controller(s) 560) of each line card 502 may optionally be mounted on a single printed circuit board.

When a packet or packet and header are received, the packet or packet and header may be identified and analyzed by the node 500 in the following manner. Upon receipt, a packet (or some or all of its control information) or packet and header may be sent from one of port processor(s) 550 at which the packet or packet and header was received and to one or more of those devices coupled to the data bus 530 (e.g., others of the port processor(s) 550, the forwarding engine 510 and/or the processor 520). Handling of the packet or packet and header may be determined, for example, by the forwarding engine 510.

For example, the forwarding engine 510 may determine that the packet or packet and header should be forwarded to one or more of the other port processors 550. This may be accomplished by indicating to corresponding one(s) of port processor controllers 560 that a copy of the packet or packet and header held in the given one(s) of port processor(s) 550 should be forwarded to the appropriate other one of port processor(s) 550. Additionally, or alternatively, once a packet or packet and header has been identified for processing, the forwarding engine 510, the processor 520, and/or the like may be used to process the packet or packet and header in some manner and/or may add packet security information in order to secure the packet.

On a node 500 sourcing a packet or packet and header, processing may include, for example, encryption of some or all of the packet or packet and header information, the addition of a digital signature, and/or some other information and/or processing capable of securing the packet or packet and header. On a node 500 receiving a packet or packet and header, the processing may be performed to recover or validate the packet or packet and header information that has been secured.

Figure 6:
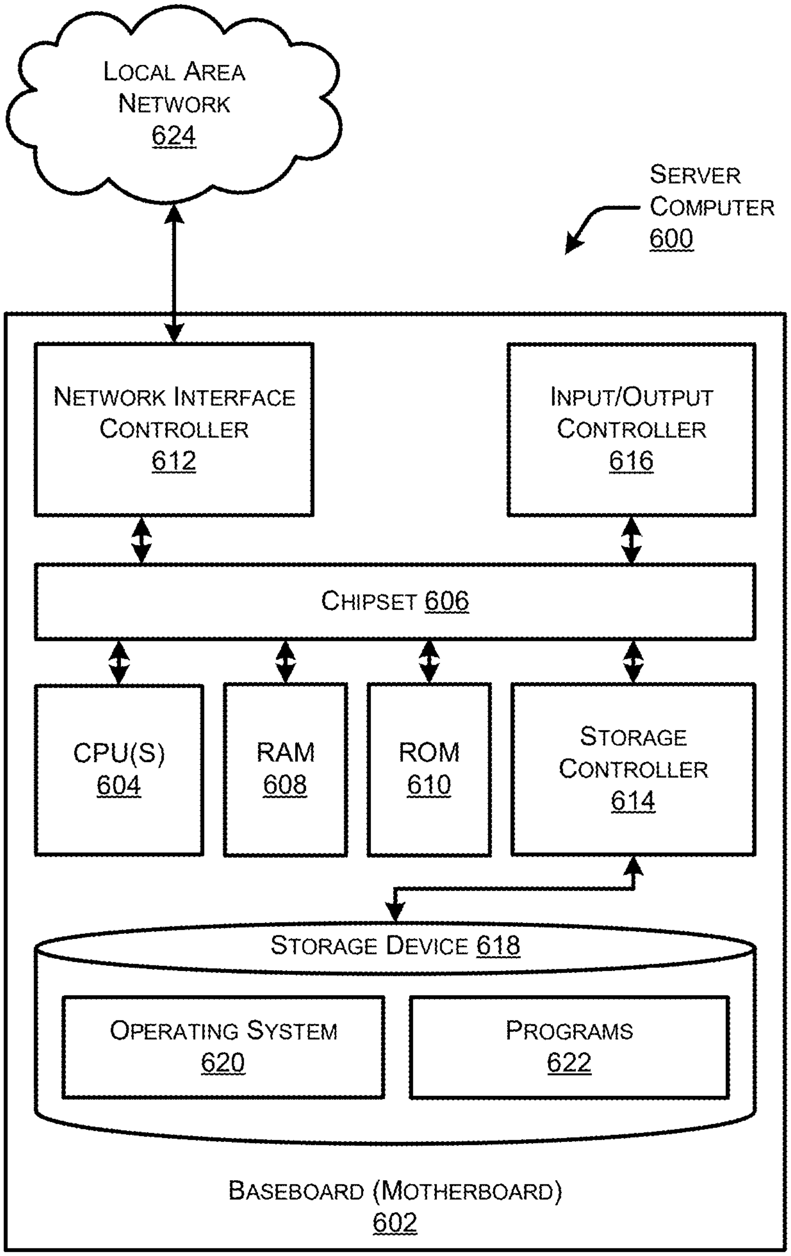
FIG. 6 illustrates an example computer hardware architecture that can implement devices in accordance with various aspects of the technologies disclosed herein.

FIG. 6 illustrates an example computer hardware architecture that can implement devices in accordance with various aspects of the technologies disclosed herein. For example, the illustrated computer hardware architecture can implement the server 150, the hubs 160A, 160B, 160C, or any of the other devices described herein in some embodiments. The computer architecture shown in FIG. 6 illustrates a conventional server computer 600, however the computer architecture can optionally implement any other computing devices such as a router, a workstation, desktop computer, laptop, tablet, network appliance, e-reader, smartphone, or other computing device. The illustrated computer architecture can be utilized to execute any of the software components presented herein.

The server computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the server computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server computer 600. The chipset 606 can further provide an interface to a computer-readable storage medium such as a read-only memory ("ROM") 610 or non-volatile RAM ("NVRAM") for storing basic routines that help to start up the server computer 600 and to transfer information between the various components and devices. The ROM 610 or NVRAM can also store other software components necessary for the operation of the server computer 600 in accordance with the configurations described herein.

The server computer 600 can operate in a networked environment using logical connections to remote computing devices and computer systems through a network, such as the LAN 624. The chipset 606 can include functionality for providing network connectivity through a NIC 612, such as a gigabit Ethernet adapter. The NIC 612 is capable of connecting the server computer 600 to other computing devices over the LAN 624. It should be appreciated that multiple NICs 612 can be present in the server computer 600, connecting the computer to other types of networks and remote computer systems.

The server computer 600 can be connected to a storage device 618 that provides non-volatile storage for the server computer 600. The storage device 618 can store an operating system 620, programs 622, and data, to implement any of the various components described in detail herein.

The storage device 618 can be connected to the server computer 600 through a storage controller 614 connected to the chipset 606. The storage device 618 can comprise one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the server computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 600 can further read information from the storage device 618 by detecting the physical states or characteristics of one or more particular locations within the physical storage units.

In addition to the mass storage device 618 described above, the server computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 600. In some examples, the operations performed by the computing elements illustrated in FIGS. 1-3, FIG. 7, and or any components included therein, may be supported by one or more devices similar to server computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the server computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the server computer 600.

In one embodiment, the storage device 618 or other computer-readable storage media is encoded with computer-executable instructions which, when loaded into the server computer 600, transform the computer from a general-purpose computing system into a special-purpose computer capable of implementing the embodiments described herein. These computer-executable instructions transform the server computer 600 by specifying how the CPUs 604 transition between states, as described above.

According to one embodiment, the server computer 600 has access to computer-readable storage media storing computer-executable instructions which, when executed by the server computer 600, can implement the architectures and perform the various processes described with regard to FIGS. 1-3 and FIG. 7. The server computer 600 can also include computer-readable storage media having instructions stored thereupon for performing any of the other computer-implemented operations described herein.

The server computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat panel display, a digital projector, a printer, or other type of output device. It will be appreciated that the server computer 600 might not include all of the components shown in FIG. 6, can include other components that are not explicitly shown in FIG. 6, or might utilize an architecture completely different than that shown in FIG. 6.

Figure 7:
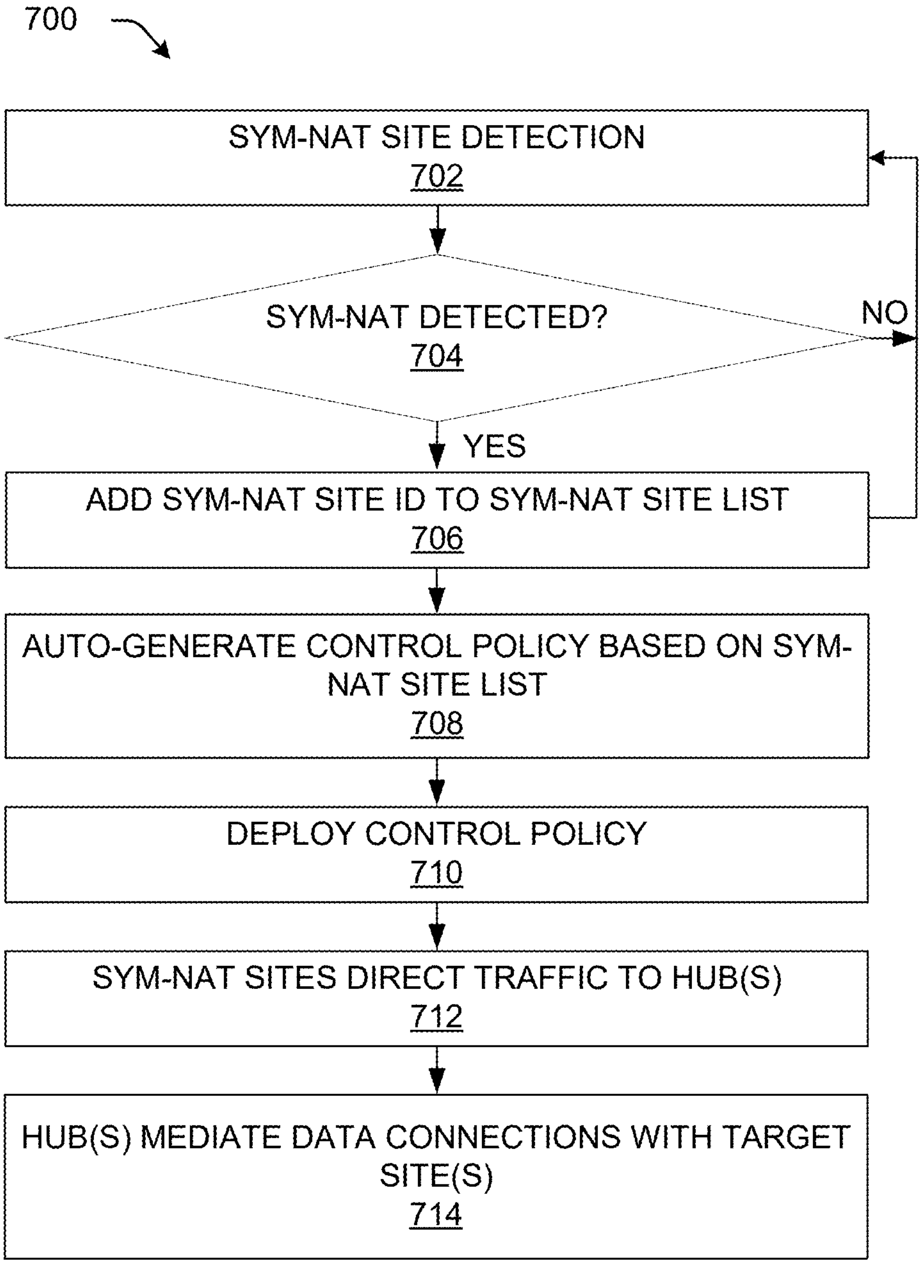
FIG. 7 is a flow diagram that illustrates an example method for symmetric NAT site detection and data connectivity support, in accordance with various aspects of the technologies disclosed herein.

FIG. 7 is a flow diagram of an example method 700 performed at least partly by a computing device, such as the server computer 600, optionally in conjunction with other computing devices. The logical operations described herein with respect to FIG. 7 may be implemented (1) as a sequence of computer-implemented acts or program modules running on a computing system and/or (2) as interconnected machine logic circuits or circuit modules within the computing system. In some examples, the method 700 may be performed by a system comprising one or more processors and one or more non-transitory computer-readable media storing computer-executable instructions that, when executed by the one or more processors, cause the one or more processors to perform the method 700.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

It should also be appreciated that more or fewer operations might be performed than shown in FIG. 7 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by fewer components, more components, different components, or any configuration of components.

FIG. 7 is a flow diagram that illustrates an example method for symmetric NAT site detection and data connectivity support, in accordance with various aspects of the technologies disclosed herein. In an example embodiment, the illustrated method can be performed by a server and one or more hubs, introduced in FIG. 1, or by a device that combines the server and one or more hubs introduced in FIG. 1.

At operation 702, the server 150 can be configured to perform symmetric NAT site detection, thereby detecting whether symmetric NAT is employed at a site 120 comprising one or more computing devices such as the devices 122, 123, and 124. In some embodiments, the devices 122, 123, and 124, as well as other computing devices, e.g., devices 132, 133, and 134 can be devices in a software defined wide area network (SD-WAN) fabric overlay.

As explained herein, detecting whether symmetric NAT is employed at a site 120 can comprise establishing at least two different network connections with the one or more computing devices at the site 120 and comparing IP addresses associated with the at least two different network connections and/or port addresses associated with the at least two different network connections. Differences between the IP addresses and differences between the port addresses can indicate employment of symmetric NAT at the site 120.

At operation 704, when a symmetric NAT site is detected, then in response to detecting that symmetric NAT is employed at the site, a site ID associated with the site can be added to a site list at operation 706 in order to apply a control policy 153 to the site 120. Detection can optionally continue by returning to operation 702 and performing detection operations on a next site. Conversely, when detection operations do not detect that a site is a symmetric NAT site, the site list is not updated to include a new site ID, and detection can optionally continue by returning to operation 702 and performing detection operations on a next site.

In some embodiments, detecting whether symmetric NAT is employed at the site 120 can be performed repetitively as shown in FIG. 7. The operations can optionally be performed in a continuous loop that performs detection on sites in parallel or serially, returning to repeat detection operations on sites at each loop cycle. Detection operations can optionally be repeated at periodic intervals or as detection resources are available, resulting in potential addition and/or removal of site identifiers from a site list with each repeated cycle. The remaining operations illustrated in FIG. 7 can optionally be performed while detection operations are ongoing.

At operation 708, a control policy 153 can be auto generated based on the symmetric NAT site list. Auto generation can be triggered, e.g., at intervals or in response to a predetermined threshold number of changes to the site list, or based on other auto-generation criteria. The control policy 153 can direct IP traffic for the site 120 to a hub 160A configured to serve as an intermediary manager of a data connection 125 between a computing device of the one or devices 122, 123, 124, and at least one other computing device associated with at least one other site, e.g., the device 132 associated with the other site 130.

In some embodiments, the hub 160A can be one of at least three hubs 160A, 160B, 160C configured to serve as intermediary managers of data connections. The hub 160A can also optionally be located in a same geographic region as the site 120. The hub 160A can be configured to use a secure tunnel to enable the data connection 125 between the device 122 and the at least one other device 132. The hub 160A can be configured to also use another secure tunnel to enable the data connection 135 which is also between the device 122 and the at least one other device 132.

At operation 710, the control policy 153 can be deployed, e.g., to sites 120, 130 and 140 as well as optionally to policy enforcement entities withing the network 110. In accordance with the a control policy 153, at operation 712 symmetric NAT sites will direct traffic to hubs 160A, 160B, 160C that are configured to serve as symmetric NAT site intermediaries. At operation 714, the hubs 160A, 160B, 160C can mediate data connections between symmetric NAT sites, e.g., the site 120, and target sites such as site 130 and/or site 140.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:

detecting, by a server coupled with a network, whether symmetric network address translation is employed at a site comprising one or more computing devices, wherein the site is remote from the server and the server is coupled with the site via the network, wherein detecting whether symmetric network address translation is employed at the site comprises establishing at least two different network connections with the one or more computing devices and comparing IP addresses associated with the at least two different network connections and port addresses associated with the at least two different network connections, wherein differences between the IP addresses and differences between the port addresses indicate employment of symmetric network address translation at the site; and the server detecting that symmetric network address translation is employed at the site, and adding, by the server, a site identifier associated with the site to a site list in order to apply a control policy to the site, wherein detecting whether symmetric network address translation is employed at the site is performed repetitively, resulting in addition and removal of site identifiers from the site list, wherein the control policy directs internet protocol (IP) traffic for the site to a hub configured to serve as an intermediary manager of a data connection between a computing device of the one or more computing devices and at least one other computing device associated with at least one other site, and wherein the hub and the at least one other site are remote from the server and the site, wherein the server is coupled with the hub and the at least one other site via the network, and wherein the hub is one of at least three hubs configured to serve as intermediary managers of data connections.

2. The method of claim 1, wherein the hub is located in a same geographic region as the site.

3. The method of claim 1, wherein the hub is configured to use a secure tunnel to enable the data connection between the computing device of the one or more computing devices and the at least one other computing device.

4. The method of claim 1, wherein the computing device of the one or more computing devices and the at least one other computing device are devices in a software defined wide area network fabric overlay.

5. The method of claim 1, wherein establishing the at least two different network connections with the one or more computing devices comprises establishing both of the at least two different network connections between the server and the one or more computing devices and using a different source IP address for each of the at least two different network connections.

6. The method of claim 1, wherein establishing the at least two different network connections with the one or more computing devices comprises establishing a first of the at least two different network connections between the hub and the one or more computing devices and establishing a second of the at least two different network connections between a second hub and the one or more computing devices.

7. The method of claim 1, wherein establishing the at least two different network connections consists of establishing three different network connections with three different hubs.

8. A server device comprising:

one or more processors; and one or more non-transitory computer-readable media storing computer-executable instructions that, when executed by the one or more processors, cause the one or more processors to perform operations comprising:

detecting, by a server coupled with a network, whether symmetric network address translation is employed at a site comprising one or more computing devices, wherein the site is remote from the server and the server is coupled with the site via the network, wherein detecting whether symmetric network address translation is employed at the site comprises establishing at least two different network connections with the one or more computing devices and comparing IP addresses associated with the at least two different network connections and port addresses associated with the at least two different network connections, wherein differences between the IP addresses and differences between the port addresses indicate employment of symmetric network address translation at the site; and the server detecting that symmetric network address translation is employed at the site, and adding, by the server, a site identifier associated with the site to a site list in order to apply a control policy to the site, wherein detecting whether symmetric network address translation is employed at the site is performed repetitively, resulting in addition and removal of site identifiers from the site list, wherein the control policy directs internet protocol (IP) traffic for the site to a hub configured to serve as an intermediary manager of a data connection between a computing device of the one or more computing devices and at least one other computing device associated with at least one other site, and wherein the hub and the at least one other site are remote from the server and the site, wherein the server is coupled with the hub and the at least one other site via the network, and wherein the hub is one of at least three hubs configured to serve as intermediary managers of data connections.

9. The device of claim 8, wherein the hub is located in a same geographic region as the site.

10. The device of claim 8, wherein the hub is configured to use a secure tunnel to enable the data connection between the computing device of the one or more computing devices and the at least one other computing device.

11. The device of claim 8, wherein the computing device of the one or more computing devices and the at least one other computing device are devices in a software defined wide area network fabric overlay.

12. The server device of claim 8, wherein establishing the at least two different network connections with the one or more computing devices comprises establishing both of the at least two different network connections between the server device and the one or more computing devices and using a different source IP address for each of the at least two different network connections.

13. The server device of claim 8, wherein establishing the at least two different network connections with the one or more computing devices comprises establishing a first of the at least two different network connections between the hub and the one or more computing devices and establishing a second of the at least two different network connections between a second hub and the one or more computing devices.

14. A method comprising:

detecting, by a first computing device, whether symmetric network address translation is employed at a site comprising one or more second computing devices, wherein the site is remote from the first computing device and the first computing device is coupled with the site via a network, wherein detecting whether symmetric network address translation is employed at the site comprises establishing at least two different network connections with the one or more second computing devices and comparing IP addresses and port addresses associated with the at least two different network connections, wherein differences between the IP addresses and differences between the port addresses indicate employment of symmetric network address translation at the site;

adding a site identifier associated with the site to a site list, wherein a control policy is applicable to sites included on the site list; and applying, by the first computing device, the control policy to the site in response to detecting that symmetric network address translation is employed at the site;

wherein detecting whether symmetric network address translation is employed at the site is performed repetitively, resulting in addition and removal of site identifiers from the site list;

wherein the control policy directs internet protocol (IP) traffic for the site to a hub configured to manage a data connection between a computing device of the one or more second computing devices and at least one other computing device, and wherein the hub is remote from the first computing device and the site, wherein the first computing device is coupled with the hub via the network, and wherein the hub is one of at least three hubs configured to serve as intermediary managers of data connections.

* * * * *